United States Patent [19]
Coloney

[11] Patent Number: 4,715,417
[45] Date of Patent: Dec. 29, 1987

[54] AIRCRAFT FUEL TANK

[76] Inventor: Wayne H. Coloney, P.O. Box 668, Tallahasse, Fla. 32302

[21] Appl. No.: 898,426

[22] Filed: Aug. 20, 1986

[51] Int. Cl.⁴ .................. B65D 90/12; B65D 8/14; B64D 37/04
[52] U.S. Cl. .................. 150/55; 220/1 B; 428/12; 428/35; 244/135 B
[58] Field of Search .......... 428/35, 12; 244/135 B, 244/130; 222/92, 174; 137/899.2; 150/51, 55

[56] References Cited
U.S. PATENT DOCUMENTS

| | | | |
|---|---|---|---|
| 2,355,084 | 8/1944 | Kurrle | 150/55 |
| 2,552,119 | 5/1951 | Scharenberg | 150/55 |
| 3,224,000 | 12/1965 | Bloetscher et al. | 428/12 |
| 4,214,721 | 7/1980 | Burhans, Jr. et al. | 244/130 |
| 4,384,603 | 5/1983 | Tyrer et al. | 150/55 |
| 4,640,328 | 2/1987 | Arney | 244/135 B |

Primary Examiner—John E. Kittle
Assistant Examiner—Beth A. Bozzelli
Attorney, Agent, or Firm—Fred Philpitt

[57] ABSTRACT

A fuel tank adapted for mounting on the exterior of an aircraft comprising a flexible fuel chamber and a plurality of flexible inflatable tubular ribs attached to the walls of the fuel chamber, with means for introducing and removing liquid from the fuel chamber and with means for inflating and deflating the inflatable ribs.

5 Claims, 9 Drawing Figures

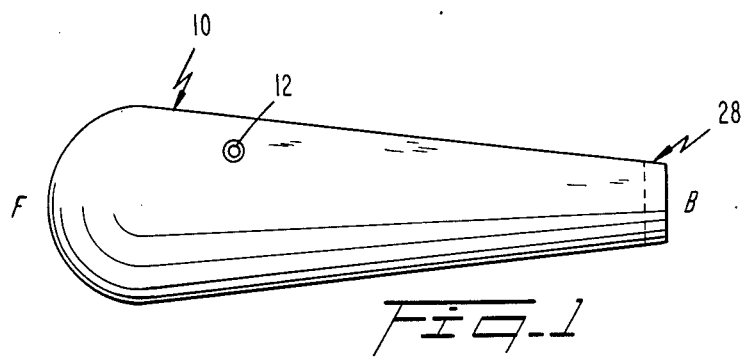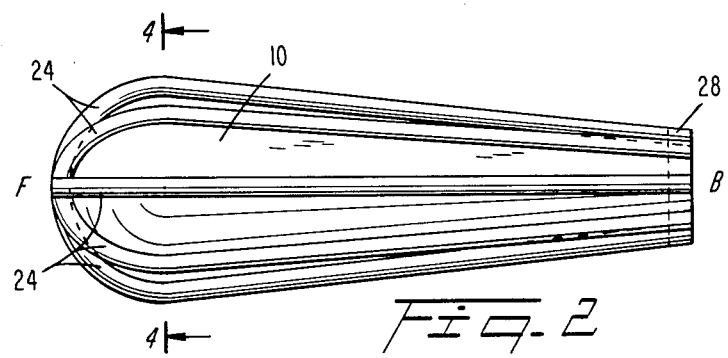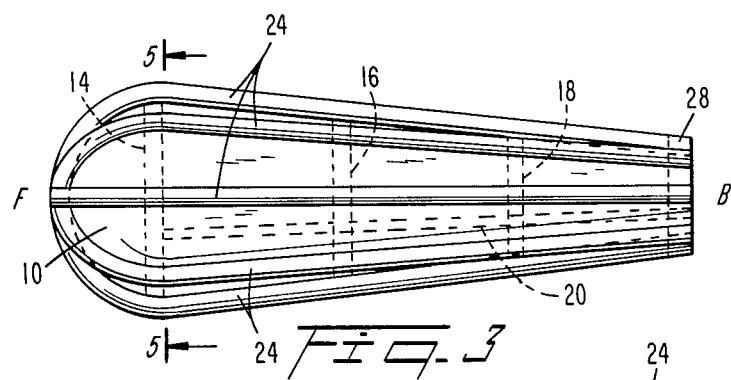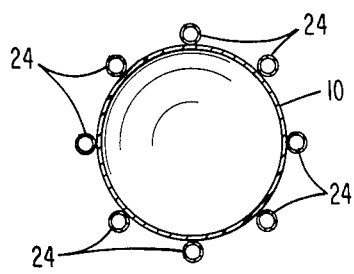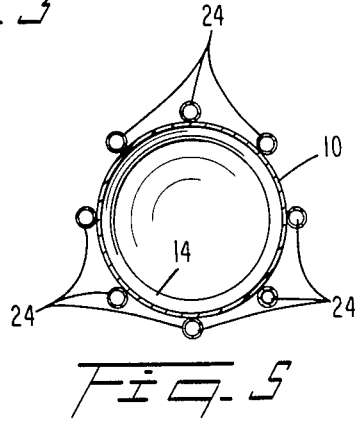

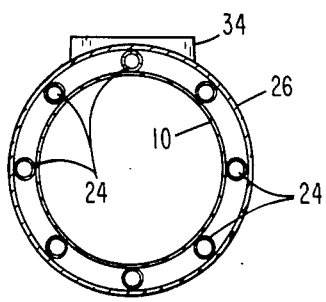
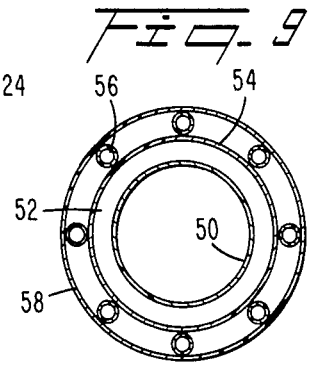
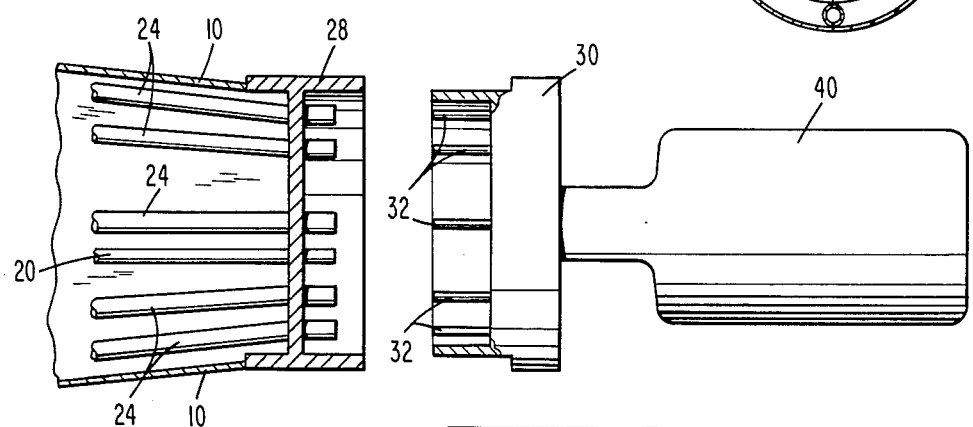
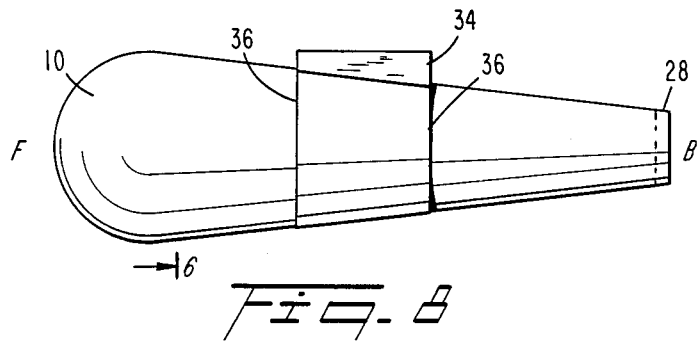

AIRCRAFT FUEL TANK

This invention pertains to a novel fuel tank for aircraft that is constructed of flexible material that can be expanded from a compact folded or rolled condition when there is not liquid fuel in the tank to an expanded or inflated condition that can accomodate the desired amount of liquid fuel.

Most combat aircraft in the United States are equipped for the use of external, expendable/reusable fuel tanks which serve the purpose of extending the range of the aircraft. In wartime, during combat missions, it would be expected that the external fuel tanks would be used prior to reaching the target area, and would then be jettisoned in order to permit greater maneuverability during combat over the target area. Internal fuel supplies would usually be relied upon for combat and for return to base.

External fuel tanks, as commonly used, range in capacity from 300 gallons to 1000 gallons. They are generally torpedoshaped, of considerable size and of relatively light weight, but from the standpoint of logistics they present difficult problems.

If shipped and stored in a fully assembled state ready for immediate use, they occupy enormous volumes of extremely valuable shipping space and, upon arrival, occupy enormous volumes of covered or protected storage space. If shipped in a disassembled state, both shipping and storage volume/space are conserved but another major problem of great significance is created. Using conventional methods, external fuel tanks are shipped in segments which must be assembled prior to use. The current external fuel tank for the F-15 aircraft is supposed to be able to be assembled in four hours by four unskilled persons. However, skilled technicians took in excess of 30 hours to assemble one F-15 external fuel tank. If fuel tanks are shipped in a disassembled state and are then uncrated and assembled, they are exposed to the weather unless stored in a covered or protected facility and they occupy great volumes of storage space as mentioned above. If they are left in a disassembled condition and an emergency arises, an air base might be overrun and lost long before sufficient external fuel tanks could be assembled with available base personnel in order to permit countersorties.

Considered from one aspect, my invention pertains to a fuel tank adapted for mounting on the exterior of an aircraft comprising in combination (a) a liquid fuel chamber constructed of a flexible liquidimpervious membrane, (b) at least one passageway for the introduction or removal of liquid fuel from said chamber, (c) a plurality of inflatable ribs attached to the walls of said liquid fuel chamber, said ribs
  (1) being composed of tubes of flexible material that can be inflated with gas or liquid,
  (2) being connected to means for inflating and deflating said tubular inflatable ribs,
  (3) being attached to said flexible liquid-impervious membrane in a pattern that, when said tubular ribs are inflated with a gas or liquid, will result in a strong supporting framework that establishes the maximum volumetric configuration and shape of said flexible liquid-impervious membrane and will cause it to be structurally strong enough to maintain its aerodynamic shape and qualities during flight at very high speeds whether it is empty or filled with fuel, and configured in such manner that when empty and demounted from the aircraft the ribs may be de-inflated, thus permitting the liquid fuel chamber to be collapsed to an essentially flattened condition that may be folded or rolled into a compact unit that occupies much less space than said maximum volumetric configuration, It should be noted that a flexible fuel chamber or tank can be constructed to assume a maximum volumetric shape when filled with liquid fuel, but that such a tank will at least partially deflate and deform as the liquid fuel is withdrawn unless some other structural support system is present. Since an external aircraft fuel tank is subjected to enormous stress during flight due to aerodynamic buffeting, and since any deformation of the external fuel tank into a non-streamlined shape could be catastrophic because of the consequent stresses imposed on the airframe of the aircraft, it is imperative that an external aircraft fuel tank maintain its shape whether full of fuel or empty and under all stress imposed during flight. My invention provides a fuel tank which will maintain its shape whether full of fuel or empty and which will have sufficient structural strength to sustain the aerodynamic loads imposed during flight without deformation, whether full or empty. Such characteristics are imparted to the flexible, collapsible fuel chamber by structural members called inflatable ribs which are more clearly defined hereinafter.

My invention will be more clearly understood by reference to the description drawings wherein:

FIG. 1 is a side view of a liquid fuel chamber,

FIG. 2 is a side view of a liquid fuel chamber and longitudinal inflatable ribs in the inflated state, FIG. 3 is a side view of a liquid fuel chamber with longitudinal inflated ribs and also circumferential inflated ribs, FIG. 4 is a cross sectional view along "4—4" of FIG. 2, FIG. 5 is a cross sectional view along "5—5" of FIG. 3, FIG. 6 is a cross sectional view of a fuel tank with an inner membrane and an exterior membrane or "skin" added to provide aerodynamic characteristics and is taken along "6—6" of FIG. 8, FIG. 7 illustrates a gas filling arrangement;

FIG. 8 illustrates means for connecting a fuel tank to a wing pylon,

FIG. 9 illustrates a further embodiment of my invention which is similar to that shown in FIGS. 3 and 5.

Referring now to the drawings, FIG. 1 shows one configuration of a liquid fuel chamber that would be useful in accordance with my invention. When filled with a fluid or otherwise expanded, the shape of the chamber generally resembles a torpedo or an elongated tear drop. The inflated or expanded shape of chamber 10 is primarily selected based on aerodynamic considerations and may vary considerably from that shown, depending on the airplane that is to carry the chamber, the flight characteristics of said airplane, the volume and type of fuel to be carried, and other design factors. As shown, the large end of the liquid fuel chamber is usually the front end when the chamber is mounted under the wing or fuselage of an airplane. The front to back dimensions of the chamber 10 is normally large in comparison with its cross-sectional diameter. The front end normally consists of a relatively blunt spherically-shaped nose and the remainder of the chamber may gradually decrease in diameter to a long tapering tail; however, the precise shape is not critical.

The liquid fuel chamber is formed from any suitable flexible liquid-impervious membrane that will not be adversely affected by the fuel or by the operating conditions. Butyl rubber membranes are satisfactory, but any rubber or synthetic material that is both flexible and impervious to fuel may be used. When the chamber does not contain fuel and is collapsed into a flattened condition, it may be folded or rolled into a compact unit.

The liquid fuel chamber 10 includes at least one passageway 12 for the introduction and/or removal of liquid fuel. Each such passageway make take the form of a simple valve known in the art and may pass through the strongback used to mount the tank under a wing. Any suitable means for filling or emptying the chamber can be used.

FIG. 2 shows the liquid fuel chamber 10 of FIG. 1 and a plurality of longitudinal inflated tubular ribs 24 disposed from the front F to the back B of chamber 10. Each such longitudinal rib is composed of a long thin tube of flexible material that can be inflated with gas or other suitable liquid or fluid. The inflatable tubular ribs 24 are secured by any suitable means to the exterior of the flexible liquid impervious membrane 10 in a number and arrangement that, when inflated with a gas or liquid, will result in a strong supporting framework that establishes the maximum volumetric configuration of the flexible liquid-impervious membrane. Air, nitrogen, carbon dioxide, helium or any other gas or appropriate liquid may be used for inflating the tubes.

FIG. 3 shows the liquid fuel chamber 10 of FIGS. 1 and 2 with the addition of circumferential inflatable ribs 14, 16 and 18 on the interior of the liquid fuel chamber. FIG. 3 also shows a fill tube 20 that interconnects circumferential tubes 14, 16 and 18 and which can be used to fill all of these circumferential tubes simultaneously. Alternatively, individual fill tubes can be provided for filling each of the circumferential tubes individually. However, the fill tube 20 could be omitted and the circumferential tubes can be filled individually through valve units associated with each circumferential tubular ring. Individual filling has the advantage that if one of the tubular ribs should fail due to leakage, the other ribs would remain intact and inflated.

The tubes 14-24 may be made of any suitable flexible material which can be inflated and maintained under the gas or liquid pressure which is necessary in order to achieve the desired degree of structural rigidity. This pressure will vary somewhat depending upon the materials used, the configuration of the tank, anticipated operating conditions, etc. The flexible material may be reinforced with any suitable strengthening material, such as filaments of metal, nylon, fiberglass, carbon, Kevlar, etc.

FIGS. 4 and 5 are cross-sectional views taken along "4—4" of FIG. 2 and "5—5" of FIG. 3.

FIG. 6 is a cross sectional view taken along "6—6" of FIG. 8 and illustrates the use of an outer flexible envelope 26 which encompasses the tubular ribs 24. This has some advantages as far as streamlined air flow is concerned. The space between walls 10 and 26 may also be pressurized so as to further assist in maintaining the desired outer configuration.

FIG. 7 shows one way of inflating the tubular ribs. In a fuel tank of the kind shown in FIG. 2 the tubular ribs 24 could converge toward the rear of the fuel chamber into a tail fitting 28, the rear-most portion of each tubular rib 24 being provided with a fill valve (not shown). When it is desired to inflate these tubular ribs, an inflation manifold 30 containing a plurality of needle valve connectors 32 is brought into engagement with the tail fitting 28 and the needle valve connectors are thus inserted into the fill valves of the tubular ribs. The gas from the high pressure gas bottle 40 will then flow into the tubular ribs 24 and, if desired, into one or more fill tubes 20 and inflate them. Gas flow into the ribs 24 and tube 20 can be simultaneous or individual depending upon the valving arrangement that is incorporated in the manifold 30. The gas cannister 40 can be either separate from or integral with the manifold 30.

FIG. 8 illustrates that my fuel tank may be provided with a strongback 34 and a supporting broad band of flexible material 36 that fits tightly around the tank. This band or sling 36 transfers the weight of the tank to the strongback and thence to the aircraft pylon. The strongback 34 can be connected to the fuel pylon on an aircraft in a well known manner. The band or sling 36 helps maintain the shape of the tank when it is filled with fuel.

FIG. 9 illustrates in cross section another embodiment of my invention wherein the flexible liquid fuel chamber 50 is surrounded by spaced apart circumferential inflatable ribs 52, which are in turn surrounded by an intermediate envelope 54 that is parallel to and spaced outwardly from said liquid fuel chamber 50, and this intermediate envelope 54 is surrounded by spaced apart longitudinal inflatable ribs 56, which are in turn surrounded by an outer envelope 58 of flexible material that is parallel to and spaced outwardly from said intermediate envelope 54 and from said liquid fuel chamber 50.

It is seen that when both the "inflatable ribs" and the fuel tank itself are empty or deflated, the entire tank can itself be rolled or folded into a small compact shape. When the "inflatable ribs" are inflated, however, the fuel tank would assume its normal shape and maximum volumetric configuration and would be light and rigid. With sufficient pressure in the "inflatable ribs" a fuel tank structure is created which has the requisite rigidity to withstand the stresses of flight while either full of fuel or while empty.

In order to deflate the fuel tank for repackaging, transshipment and use elsewhere, a deflation pump would be packed with each group of tanks. This deflation pump would attach to the inflation manifold 30, could be manually or power operated and would be, in essence, a vacuum pump which would permit the quick and relatively complete evacuation of gas or liquid from the "inflatable ribs".

Although it is preferred that my fuel tank be constructed entirely of flexible material, I also contemplate that the tank may include a limited number of elongated stiffening members in order to add strength. If such elongated stiffening members are employed, it is contemplated that the tank could be flattened for shipment but would probably not be otherwise folded.

I contemplate that a metallic or plastic nose cone may be affixed to the blunt end of my aforementioned fuel tank in order to reduce wear due to abrasive particles in the air, or to protect the flexible membranes from flight stresses, or for other aerodynamic purposes.

External fuel tanks require complex pumping, gauging and monitoring systems in addition to requiring an appropriate connecting system which will permit its attachment to the fuel pylons on the aircraft. These items are well known in this art and will not be described here since they do not constitute the novelty of the present invention. It is contemplated, however, that such devices, as needed could be located in the strongback 34, could accomplish transfer of fuel from the chamber to the aircraft during flight and could also permit filling of the chamber with fuel.

In summary, my fuel tank has the following advantages:

1. In its collapsed/deflated condition it would occupy less space than the fuel tanks currently in use, especially those used by military planes.

2. It would require no assembly. To make it ready for use, it would simply be removed from its package and unrolled or unfolded. Any suitable inflation device would be connected to the tank and the pressurized gas cannister or a liquid pump would be attached to the inflation device 30 after which the cannister valve would be opened or the liquid pump activated, thus inflating the "inflatable ribs" and causing the fuel tank to assume its operable shape. All pumps, gauges and monitoring systems would already be in place in the attached strongback 34 or in such other locations as design requirements might dictate and would be ready for immediate use as opposed to present practice.

3. Because of the dense packaging, field personnel find it virtually impossible to disassemble a group of presently available fuel tanks and to repackage them. Once a fuel tank has been assembled, for all practical purposes it must remain assembled. In contrast, my tank can be readily deflated, rolled/folded and returned to its original package by unskilled personnel in minimum time using the deflation pump supplied with each tank or with each group of tanks, depending upon the packaging mode.

In conclusion, while the foregoing specification and drawings describe the contruction, operation and use of a preferred embodiment of my invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly, it is intended to encompass all changes, variations and modifications falling within the scope of the appended claims, as well as obvious equivalents thereof, such as the use of tubular inflatable ribs to impart shape, form, rigidity and structural strength to a fuel container, bladder, chamber or cell composed of a flexible liquid impervious membrane.

What I claim is:

1. A fuel tank adapted for mounting on the exterior of an aircraft comprising in combination
   (a) a liquid fuel chamber constructed of a flexible liquid-impervious memberane and in the general shape of an elongated tear drop or other suitably aerodynamic shape,
   (b) at least one passageway for the introduction or removal of liquid from said fuel chamber,
   (c) a pluraity of inflatable ribs attached to the outside walls of said liquid fuel chamber, said ribs
      (1) being composed of tubes of flexible material that can be inflated with gas or liquid,
      (2) being connected to means for inflating and deflating said tubular inflatable ribs.
      (3) being attached to said flexible liquid-impervious membrane in a pattern at spaced apart intervals extending from the front portion to the rear portion of said fuel tank that, when said tubular ribs are inflated with a gas or liquid, will result in a strong supporting framework that establishes the maximum volumetric configuration and shape of said flexible liquid-impervious membrane and will cause it to be structurally strong enough to maintain its aerodynamic shape and qualities during flight at very high speeds, whether it is empty or filled with fuel, and configured in such a manner that when empty and demounted from the aircraft the ribs may be de-inflated, thus permitting the liquid fuel chamber to be collapsed to an essentially flattend condition that may be folded or rolled into a compact unit that occupies much less space than said maximum volumetric configuration, and
   (d) an outer envelope of flexible material surrounding said plurality of inflatable ribs, said outer envelope being parallel to and spaced outwardly from said liquid fuel chamber.

2. A fuel tank according to claim 1 wherein said tubular ribs extend from the front portion to the rear portion of said fuel tank at spaced apart circumferential intervals.

3. A fuel tank according to claim 1 wherin said tubular ribs comprise a series of circular tubes that are located at spaced apart intervals extending from the front portion to the rear portion of said fuel tank.

4. A fuel tank according to claim 1 wherein said tubular ribs are disposed on the inside of said flexible liquid-impervious membrane.

5. A fuel tank according to claim 1 wherein said liquid fuel chamber is surrounded by circumferential inflatable ribs which are in turn surrounded by an intermediate envelope of flexible material that is parallel to and spaced outwardly from said liquid fuel chamber and said intermediate envelope is surrounded by longitudinal inflatable ribs which are then in turn surrounded by an outer envelope of flexible material that is parallel to and spaced outwardly from said interemediate envelope and from said liquid fuel chamber.

* * * * *